(12) United States Patent
Rothbrust et al.

(10) Patent No.: US 11,254,618 B2
(45) Date of Patent: Feb. 22, 2022

(54) PROCESS FOR PRODUCING A GLAZED CERAMIC BODY

(71) Applicant: Ivoclar Vivadent AG, Schaan (LI)

(72) Inventors: Frank Rothbrust, Röns (AT); Ronny Hengst, Brand-Erbisdorf (DE); Sebastian Krolikowski, Lachen (CH); Christian Ritzberger, Grabs (CH); Diana Tauch, Drammen (NO)

(73) Assignee: Ivoclar Vivadent AG, Schaan (LI)

( * ) Notice: Subject to any disclaimer, the term of this patent is extended or adjusted under 35 U.S.C. 154(b) by 28 days.

(21) Appl. No.: 16/488,690

(22) PCT Filed: Mar. 23, 2018

(86) PCT No.: PCT/EP2018/057527
§ 371 (c)(1),
(2) Date: Aug. 26, 2019

(87) PCT Pub. No.: WO2018/172544
PCT Pub. Date: Sep. 27, 2018

(65) Prior Publication Data
US 2021/0002181 A1    Jan. 7, 2021

(30) Foreign Application Priority Data
Mar. 23, 2017  (EP) ..................... 17162531

(51) Int. Cl.
*C04B 41/50* (2006.01)
*C03C 3/083* (2006.01)
(Continued)

(52) U.S. Cl.
CPC ........ *C04B 41/5022* (2013.01); *A61C 13/083* (2013.01); *C03C 3/083* (2013.01);
(Continued)

(58) Field of Classification Search
CPC ............... C04B 41/5022; C04B 41/86; C04B 2111/00836; C04B 2201/10;
(Continued)

(56) References Cited

U.S. PATENT DOCUMENTS 4,626,392 A   12/1986  Kondo et al.
5,447,967 A   9/1995   Tyszblat
(Continued)

FOREIGN PATENT DOCUMENTS

| CN | 102344285 | * | 2/2012 | ............. A61K 6/818 |
| DE | 2105822 A1 | | 8/1972 | |
| WO | 9952467 A1 | | 10/1999 | |

OTHER PUBLICATIONS

International Preliminary Report on Patentability of PCT/EP2018/057527, dated Sep. 24, 2019, 9 pages.
Jinhui, Dai et al., "An Introduction to Inorganic Non-Metallic Materials," Harbin Institute of Technology Press, p. 132, Aug. 31, 2009.

*Primary Examiner* — Karl E Group
*Assistant Examiner* — Cameron K Miller
(74) *Attorney, Agent, or Firm* — Ann M. Knab; Thad McMurray

(57) ABSTRACT

A process for producing a glazed ceramic body, in which a glazing material is applied to a non-densely sintered substrate material and the substrate material and the glazing material are subjected to a heat treatment in order to obtain the glazed body.

19 Claims, 3 Drawing Sheets

(51) Int. Cl.
  *A61C 13/083* (2006.01)
  *C03C 4/00* (2006.01)
  *C03C 8/02* (2006.01)
  *C04B 41/86* (2006.01)
  *C04B 111/00* (2006.01)

(52) U.S. Cl.
  CPC .............. *C03C 4/0021* (2013.01); *C03C 8/02* (2013.01); *C04B 41/86* (2013.01); *C03C 2205/06* (2013.01); *C03C 2209/00* (2013.01); *C04B 2111/00836* (2013.01); *C04B 2201/10* (2013.01)

(58) Field of Classification Search
  CPC ..... A61C 13/083; C03C 3/083; C03C 4/0021; C03C 8/02; C03C 2205/06; C03C 2209/00
  See application file for complete search history.

(56) References Cited

U.S. PATENT DOCUMENTS

| | | | |
|---|---|---|---|
| 6,376,397 B1* | 4/2002 | Petticrew | B28B 5/04 501/5 |
| 8,815,327 B2 | 8/2014 | Zhang et al. | |
| 9,090,511 B2 | 7/2015 | Rothbrust et al. | |
| 9,132,067 B2 | 9/2015 | Glueck et al. | |
| 2005/0164045 A1 | 7/2005 | Rothbrust et al. | |
| 2008/0081103 A1* | 4/2008 | Tauch | A61K 6/818 427/2.29 |
| 2008/0241551 A1* | 10/2008 | Zhang | C04B 41/009 428/428 |
| 2011/0171604 A1* | 7/2011 | Durbin | A61C 9/0053 433/213 |
| 2012/0225201 A1 | 9/2012 | Glueck et al. | |
| 2015/0140513 A1* | 5/2015 | Burke | C03C 3/085 433/202.1 |

* cited by examiner

50% T.D.

80% T.D.

95% T.D.

99.7% T.D.

PROCESS FOR PRODUCING A GLAZED CERAMIC BODY

CROSS-REFERENCE TO RELATED APPLICATIONS

This application is a National Stage application of International patent application PCT/EP2018/057527 filed on Mar. 23, 2018, which claims priority to European patent application No. 17162531.2 filed on Mar. 23, 2017, the disclosures of which are incorporated herein by reference in their entirety.

FIELD OF THE INVENTION

The present invention relates to a process for glazing a ceramic body that has not yet been densely sintered.

BACKGROUND OF THE INVENTION

Ceramic materials such as oxide ceramics are often used for the production of fully anatomical dental restorations. These offer high clinical safety, are usually metal-free, can also be used in minimally invasive preparations and are very attractive in terms of price in comparison with other metal-free restorations. However, a disadvantage is the numerous work steps which are usually required for the production of such restorations.

The restorations are usually milled or ground out of presintered blanks, optionally characterized in terms of colour, densely sintered by thermal treatment, further characterized by means of painting techniques and finally glazed. As a rule, the glazing is carried out by applying a glaze to densely sintered restorations and thermal treatment in the temperature range of from 700 to 950° C.

In addition, the application of veneering materials to the surface of partially sintered oxide ceramics is also known. However, in this case, the veneering materials infiltrate into the ceramic during the thermal treatment.

Thus, in U.S. Pat. Nos. 4,626,392 A, 5,447,967 A and WO 99/52467 A1, methods are described in which a veneering material diffuses into an oxide ceramic and, with this, forms an inorganic-inorganic composite material at the surface between the polycrystalline substrate and the veneer.

In WO 2011/050786 A2 and US 2012/225201 A1 an adhesion promoter is described which is applied to a partially sintered oxide ceramic and diffuses into the surface during the sintering. After the dense-sintering step, a veneering ceramic is then applied and sintered again. The adhesion promoter represents the joining element between the oxide ceramic and the veneering ceramic sintered onto it.

In addition, so-called glass-infiltrated ceramics are known in dental technology which are produced by infiltrating mostly silicate materials into porous oxide ceramic materials, wherein penetrated structures with altered properties are usually formed. Thus, WO 2008/060451 A2 describes so-called sandwich structures which are produced by infiltrating glass-ceramic materials into substrates made from non-finally sintered $ZrO_2$. Particular properties can, in part, be positively influenced in this way, but the optical properties in particular are often impaired.

WO 2005/070322 A1 and US 2005/164045 A1 describe a process in which a sol is infiltrated into a substrate at room temperature under vacuum and dense sintering is then carried out.

SUMMARY OF THE INVENTION

The object underlying the invention is therefore to provide an improved process for producing glazed ceramic bodies that avoids the above-mentioned disadvantages and is characterized by a smaller number of process steps, without impairing the optical and other physical and chemical properties of the ceramic.

This object is achieved by the process for producing a glazed ceramic body according to claims. A subject of the invention is also the use of a glazing material for glazing a substrate material according to the claims.

BRIEF DESCRIPTION OF THE DRAWINGS

Further advantages, details and features will arise from the following description of several examples of the invention while making reference to the drawings, wherein.

DETAILED DESCRIPTION

Figure 1:
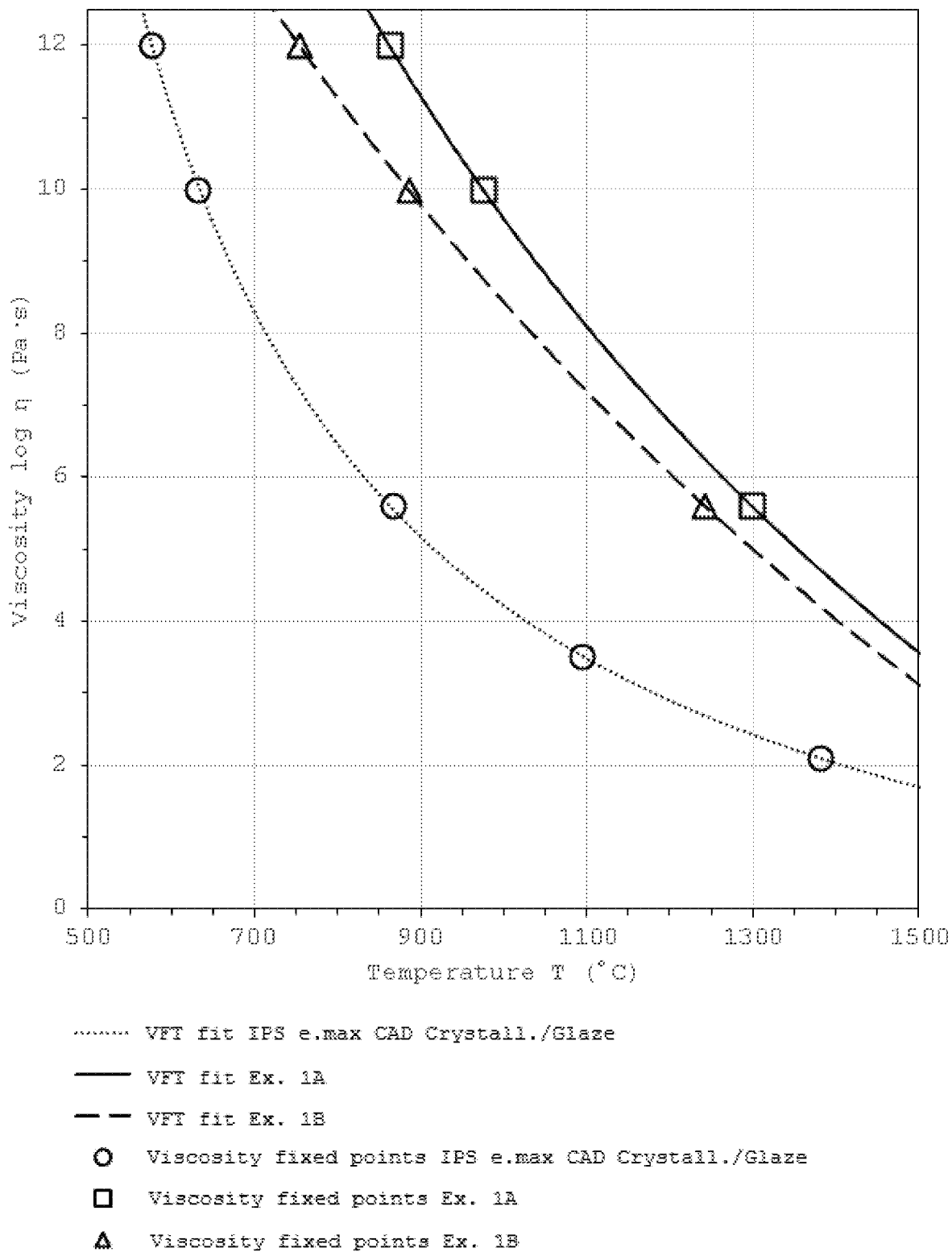
FIG. 1 shows viscosity-temperature curves for materials obtained in Examples 1A-B.

The process according to the invention for producing a glazed ceramic body is characterized in that
(a) a glazing material is applied to a non-densely sintered substrate material and
(b) the substrate material and the glazing material are subjected to a heat treatment in a temperature range which extends from a first temperature $T_1$ to a second temperature $T_2$, which is higher than the first temperature, in order to obtain the glazed body,
wherein, at the temperature $T_1$, the glazing material has a viscosity of more than $10^{2.5}$ Pa·s and, at the temperature $T_2$, a viscosity of less than $10^9$ Pa·s.

At the temperature $T_1$, the glazing material preferably has a viscosity of more than $10^{4.0}$ Pa·s, in particular more than $10^{5.6}$ Pa·s and particularly preferred more than $10^{7.0}$ Pa·s, and, at the temperature $T_2$, a viscosity of preferably less than $10^7$ Pa·s and in particular less than $10^{5.6}$ Pa·s. It is particularly preferred that the glazing material has, at the temperature $T_1$, has a viscosity of more than $10^{5.6}$ Pa·s, in particular more than $10^{7.0}$ Pa·s, and, at the temperature $T_2$, a viscosity of less than $10^{5.6}$ Pa·s.

The viscosity of the glazing material can, in particular, be determined using a viscosity-temperature curve based on the Vogel-Furcher-Tammann equation (VFT equation)

$$\log_{10}(\eta) = A + \frac{B}{T - T_0}$$

η: dynamic viscosity at the temperature T
A, B, $T_0$: substance-specific constants.

This equation is solved starting from at least three and preferably five pairs of values of characteristic temperatures determined experimentally by means of a dilatometer or heating microscope, respectively, and the associated viscosity values:

| Designation and measurement method | η (Pa · s) |
|---|---|
| $T_g$ (glass transition point from dilatometer) | 12 |
| $T_d$ (softening temperature from dilatometer) | 10 |
| $T_S$ (softening point from heating microscope) | 5.6 |
| $T_{HB}$ (hemisphere point from heating microscope) | 3.5 |
| $T_F$ (flow point from heating microscope) | 2.1 |

The equation is solved by an approximation method according to the least-squares method.

It has surprisingly been shown that the process according to the invention allows direct glazing of not yet densely sintered substrates without the glazing material penetrating into the substrate material to a significant extent. The complex double heat treatment for dense-sintering and glazing can, in principle, thereby be dispensed with without a substantial change in the properties of the substrate material occurring through infiltration.

The non-densely sintered substrate material is, for example, an unsintered and preferably a presintered substrate material. The non-densely sintered substrate material usually has a relative density in the range of from 30 to 90%, in particular in the range of from 40 to 80% and preferably in the range of from 50 to 70%, based on the true density of the substrate material. It is preferred that the substrate material starts to sinter at the temperature $T_1$. It is further preferred that the substrate material is densely sintered at the temperature $T_2$. The substrate material is preferably kept at the temperature $T_2$ for a duration of 5 to 120 minutes, in particular 10 to 60 minutes and even more preferred 20 to 30 minutes. At the temperature $T_2$, the substrate material typically has a relative density of at least 97%, in particular at least 98%, preferably at least 99% and most preferably at least 99.5%, based on the true density of the substrate material.

The relative density is the ratio of the density of the substrate material to the true density of the substrate material.

The density of the substrate material can be determined by weighing it and geometrically determining its volume. The density is then calculated in accordance with the known formula density=mass/volume.

The true density of the substrate material is determined by grinding the substrate material to a powder with an average particle size of 10 to 30 µm, in particular of 20 µm, based on the number of particles, and determining the density of the powder by means of a pycnometer. The determination of the particle size can be carried out, for example, with the CILAS® Particle Size Analyzer 1064 from Quantachrome GmbH & Co. KG using laser diffraction in accordance with ISO 13320 (2009).

In a preferred embodiment, at a temperature $T_x$, at which the substrate material has a relative density of 95% based on the true density of the substrate material, the glazing material has a viscosity of more than $10^{2.5}$ Pa·s and preferably more than $10^{4.0}$ Pa·s. In a particularly preferred embodiment, the glazing material has, at the temperature $T_1$, a viscosity of more than $10^{5.6}$ Pa·s and in particular more than $10^{7.0}$ Pa·s, at the temperature $T_x$, at which the substrate material has a relative density of 95%, based on the true density of the substrate material, a viscosity of more than $10^{2.5}$ Pa·s and preferably more than $10^{4.0}$ Pa·s and, at the temperature $T_2$, a viscosity of less than $10^9$ Pa·s, in particular less than $10^7$ Pa·s and preferably less than $10^{5.6}$ Pa·s. In an even further preferred embodiment, the glazing material has, at the temperature $T_1$, a viscosity of more than $10^{7.0}$ Pa·s, at the temperature $T_x$, at which the substrate material has a relative density of 95%, based on the true density of the substrate material, a viscosity of more than $10^{4.0}$ Pa·s and, at the temperature $T_2$, a viscosity of less than $10^{5.6}$ Pa·s.

The process according to the invention is suitable for a wide variety of ceramic substrate materials. Examples of suitable substrate materials are oxide ceramics, in particular oxide ceramics based on $ZrO_2$, $Al_2O_3$ or inorganic-inorganic composite materials, as well as glasses and glass ceramics. Particularly preferred substrate materials are oxide ceramics based on $ZrO_2$ and in particular based on nanoscale $ZrO_2$.

In a particularly preferred embodiment of the invention the substrate material comprises at least two layers, which differ in their chemical composition and/or in particular in their colour.

As a rule, at a temperature of 950° C., the glazing material used in the process according to the invention has a viscosity of more than $10^{2.5}$ Pa·s. Furthermore, at a temperature of 1300° C., it typically has a viscosity of more than $10^{2.5}$ Pa·s. In addition, as a rule, at a temperature of 1450° C., it has a viscosity of less than $10^9$ Pa·s. Preferred glazing materials are characterized in that, at a temperature of 950° C., they have a viscosity of more than $10^{4.0}$ Pa·s, preferably more than $10^{5.6}$ Pa·s and particularly preferably more than $10^{7.0}$ Pa·s, at a temperature of 1300° C., have a viscosity of more than $10^4$ Pa·s and/or, at a temperature of 1450° C., have a viscosity of less than $10^7$ Pa·s and preferably less than $10^{5.6}$ Pa·s.

Furthermore, glazing materials are preferred according to the invention which, at a temperature of 700° C., have a viscosity of more than $10^{2.5}$ Pa·s, at a temperature of 900° C., a viscosity of more than $10^{2.5}$ Pa·s and/or, at a temperature of 1100° C., a viscosity of less than $10^9$ Pa·s. Particularly preferred glazing materials are characterized in that, at a temperature of 700° C., they have a viscosity of more than $10^{4.0}$ Pa·s, preferably more than $10^{5.6}$ Pa·s and particularly preferably more than $10^{7.0}$ Pa·s, at a temperature of 900° C., have a viscosity of more than $10^4$ Pa·s and/or, at a temperature of 1100° C., have a viscosity of less than $10^7$ Pa·s and preferably less than $10^{5.6}$ Pa·s.

The glazing material preferably comprises a frit. Particularly suitable are glazing materials which contain $SiO_2$, $Al_2O_3$ and $K_2O$ and/or $Na_2O$. Glazing materials are preferred which contain at least one and preferably all of the following components in the given amounts:

| Component | wt.-% |
|---|---|
| $SiO_2$ | 50.0 to 80.0, preferably 60.0 to 70.0 |
| $Al_2O_3$ | 10.0 to 30.0, preferably 15.0 to 25.0 |
| $K_2O$ | 0 to 20.0, preferably 5.0 to 15.0 |
| $Na_2O$ | 0 to 10.0, preferably 0.5 to 5.0 |
| CaO | 0 to 10.0, preferably 0.1 to 1.0 |
| BaO | 0 to 10.0, preferably 0.1 to 1.0 |

According to the invention, the glazing material can be applied to the substrate material for example in the form of a powder, a slip, a spray or a lacquer, by means of an airbrushing method or by means of a transfer material. In an embodiment, the glazing material is mixed with a carrier, in particular water, to form a slip and this slip is applied to the substrate material for example with the aid of a brush. In a preferred embodiment, the glazing material is usually mixed in a pressurized container with a suitable carrier, in particular a propellant, and applied to the substrate material in the form of a spray. In a further embodiment, the glazing material is mixed with a liquid carrier, in particular water, and applied to the substrate material by means of an airbrushing method. Alternatively, the glazing material can be applied in dry form to a substrate material wetted with a liquid, in particular water, by means of an airbrushing method. In yet another embodiment, the glazing material is applied to a transfer material, in particular a film or an adhesive strip, and transferred to the substrate material with the transfer material. The transfer material can subsequently be detached or removed by means of a thermal treatment.

In a preferred embodiment, the glazing material is used in the form of a composition which further contains at least one carrier and/or solvent and preferably at least one inorganic and/or organic filler.

The process according to the invention is characterized, above all, in that the glazing material does not substantially penetrate into the substrate material.

The process according to the invention is suitable in particular for the production of glazed dental bodies. It is therefore preferred according to the invention that the glazed ceramic body is a glazed dental body and in particular a glazed dental restoration. It is furthermore preferred that the non-densely sintered substrate material has the shape of a dental restoration. Particularly preferred dental restorations are bridges, inlays, onlays, crowns, veneers and abutments.

The invention further relates to the use of a glazing material for glazing a non-densely sintered substrate material, in which the glazing material is applied to the non-densely sintered substrate material and the substrate material and the glazing material are subjected to a heat treatment in a temperature range which extends from a first temperature $T_1$ to a second temperature $T_2$, which is higher than the first temperature. At the temperature $T_1$, the glazing material preferably has a viscosity of more than $10^{2.5}$ Pa·s and, at the temperature $T_2$, a viscosity of preferably less than $10^9$ Pa·s. Preferred glazing materials are characterized in that, at the temperature $T_1$, they have a viscosity of more than $10^{4.0}$ Pa·s, preferably more than $10^{5.6}$ Pa·s and particularly preferably more than $10^{7.0}$ Pa·s and/or, at the temperature $T_2$, have a viscosity of less than $10^7$ Pa·s and preferably less than $10^{5.6}$ Pa·s. Further preferred embodiments of the use according to the invention result from the above description of the process according to the invention.

The invention is explained in more detail in the following with reference to examples.

EXAMPLES

Examples 1A-B

Preparation of the Glazing Materials

Two different glasses with the compositions given in Table I were prepared as glazing materials according to the invention.

TABLE I

| Component | Example 1A wt.-% | Example 1B wt.-% |
|---|---|---|
| $SiO_2$ | 65.41 | 73.39 |
| $K_2O$ | 11.62 | 10.25 |
| $Na_2O$ | 2.25 | 1.98 |
| $Al_2O_3$ | 20.72 | 14.38 |
| Total | 100.00 | 100.00 |

For this purpose, first of all 200 g of the raw materials quartz powder ($SiO_2$), potassium carbonate ($K_2CO_3$), sodium carbonate ($Na_2CO_3$) and aluminium oxyhydroxyhydrate ($AlO(OH) \times H_2O$) were thoroughly mixed for 30 min by means of a Turbula mixer.

From the homogeneous mixtures, cylindrical compacts with a diameter of about 40 mm and weighing about 25 g were produced uniaxially by means of a hydraulic press at a pressure of 3 MPa. These compacts were heated up to 1000° C. in a furnace on a quartz dish over 6 h and held at this temperature for a further 6 h. After cooling in the furnace, the compacts were comminuted by means of a jaw crusher to a size of about 1.5 mm and subsequently ground in a mortar grinder (Retsch R200) for 15 min.

The calcined mixture was pressed by means of a hydraulic press at a pressure of 3 MPa to form compacts with a diameter of about 40 mm. These compacts were heated up to 1150° C. in a furnace on a quartz dish over 6 h and held at this temperature for a further 6 h. After cooling in the furnace, the compacts were comminuted by means of a jaw crusher to a size of about 1.5 mm and subsequently ground in a mortar grinder (Retsch R200) for 15 min.

From the calcined mixture, tempered cakes weighing about 40 g were produced by means of a hand press and placed in the hot furnace (Nabertherm HT16/17) on quartz dishes with a little quartz powder as separating agent at about 1000° C. The tempered cakes were then heated at 10 K/min to 1450° C. (Example 1A) and 1400° C. (Example 1B), respectively and held at this temperature for 1.5 h. After the holding time had finished, the tempered cakes were cooled for about 2 min in air and then quenched in a water bath. The blanks obtained in this way were comminuted by means of a jaw crusher to a size of about 1.5 mm and subsequently ground in a mortar grinder (Retsch R200) for 15 min.

Examples 2A-B

Determination of the Viscosity Properties of the Glazing Materials

For the determination of the viscosity properties of the glazing materials obtained in Examples 1A-B as a function of the temperature, a viscosity-temperature curve was calculated on the basis of the Vogel-Furcher-Tammann equation (VFT equation):

$$\log_{10}(\eta) = A + \frac{B}{T - T_0}$$

$\eta$: dynamic viscosity at the temperature T
A, B, $T_0$: substance-specific constants For this purpose, at least three of the following characteristic temperatures were determined experimentally by means of a dilatometer or a heating microscope, respectively:

| Designation and measurement method | η (Pa · s) |
|---|---|
| $T_g$ (glass transition point from dilatometer) | 12 |
| $T_d$ (softening temperature from dilatometer) | 10 |
| $T_S$ (softening point from heating microscope) | 5.6 |
| $T_{HB}$ (hemisphere point from heating microscope) | 3.5 |
| $T_F$ (flow point from heating microscope) | 2.1 |

The temperatures $T_g$ and $T_d$ were determined by means of a dilatometer (Bahr-Thermoanalyse GmbH) with a quartz glass push-rod and holder. The material to be examined was heated at a heating rate of 5 K/min to the softening point (maximum 1000° C.). During the measurement, the set-up was flushed with nitrogen.

The temperatures $T_S$, $T_{HB}$ and $T_F$ were determined by means of a heating microscope (Hesse Instruments with EMA I software). The material to be examined was heated in a tube furnace at a heating rate of 10 K/min. The software automatically determines the characteristic changes in shape of the sample and assigns the corresponding temperature to them.

Starting from the pairs of values of the experimentally determined characteristic temperatures and the associated viscosity values stated above, the VFT equation was solved by an approximation method according to the least-squares method with the aid of the solver function of the Microsoft Excel 2016 MSO (16.0.4456.1003) 32-bit software.

The viscosity-temperature curves determined in this way for the glazing materials obtained in Examples 1A-B are shown in FIG. 1. For comparison, this also shows a viscosity-temperature curve determined analogously for a commercially available glazing material (IPS e.max CAD Crystall./Glaze Spray, Ivoclar Vivadent AG).

Examples 3A-B

Use of the glazing materials for glazing

Small plates (19 mm×15.4 mm×1.5 mm) were cut from commercially available blanks made of presintered $ZrO_2$ (IPS e.max ZirCAD MO 0, Ivoclar Vivadent AG) and these were used without further thermal pretreatment as substrate material. By means of an airbrushing method using a spray gun (VITA SPRAY-ON, Vita Zahnfabrik) at a working pressure of about 1 bar and from a distance of about 10 cm, aqueous suspensions of the glazing materials A and B prepared in Examples 1A-B were sprayed onto these small plates and, after drying in air for 30 min in a furnace (Sintramat S1 1600, Ivoclar Vivadent AG, program P1), densely sintered within 70 min and simultaneously glazed.

Figure 2A:
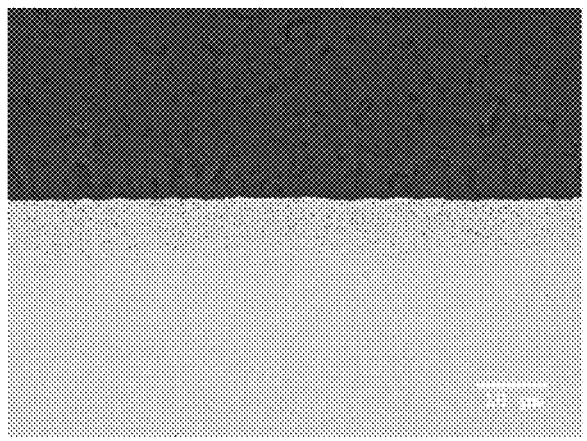
FIG. 2A shows a scanning electron microscopy micrograph of
Example 3A.
Figure 2B:
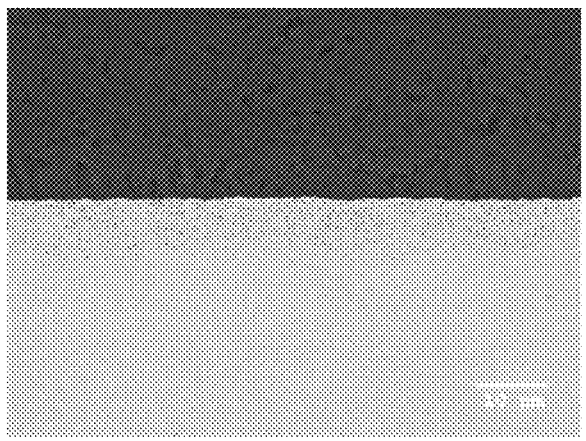
FIG. 2B shows a scanning electron microscopy micrograph of
Example 3B.

After the sintering, the glazed small $ZrO_2$ plates were embedded in a two-component resin (EpoKwick Epoxy Resin/EpoKwick Epoxy Hardener 10:2, Buehler), polished at the boundary surface to optical quality (Apex Diamond Grinding Discs, Buehler, grain size to 0.5 μm) and subsequently examined by means of scanning electron microscopy (SEM, backscattered electrons). The results are shown in FIG. 2A (Example 3A) and FIG. 2B (Example 3B). The results show that the glazing materials according to the invention have not infiltrated into the substrate material in appreciable amounts.

Example 3C (Comparison)

Use of a Commercial Glazing Material for Glazing

Analogously to Examples 3A-B, small plates were cut from commercially available blanks made of presintered $ZrO_2$ (IPS e.max ZirCAD MO 0, Ivoclar Vivadent AG). By means of an airbrushing method using a spray gun (VITA SPRAY-ON, Vita Zahnfabrik) at a working pressure of about 1 bar and from a distance of about 10 cm, an aqueous suspension of a commercially available glazing material (IPS e.max CAD Crystall./Glaze Spray, Ivoclar Vivadent AG) was sprayed onto these small plates and, after drying in air for 30 min in a furnace (Sintramat S1 1600, Ivoclar Vivadent AG, program P1), densely sintered within 70 min and simultaneously glazed.

Figure 2C:
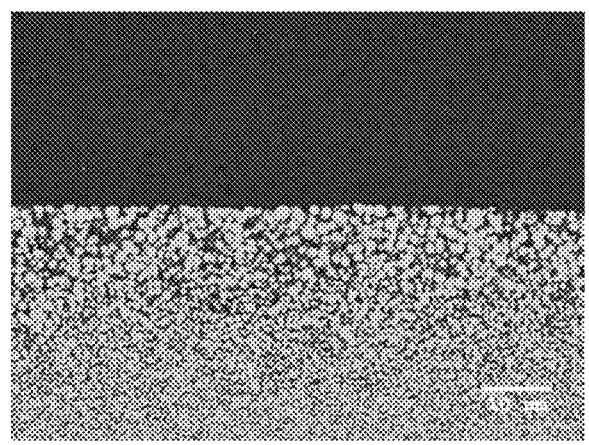
FIG. 2C shows a scanning electron microscopy micrograph of
Example 3C.
Figure 3A:
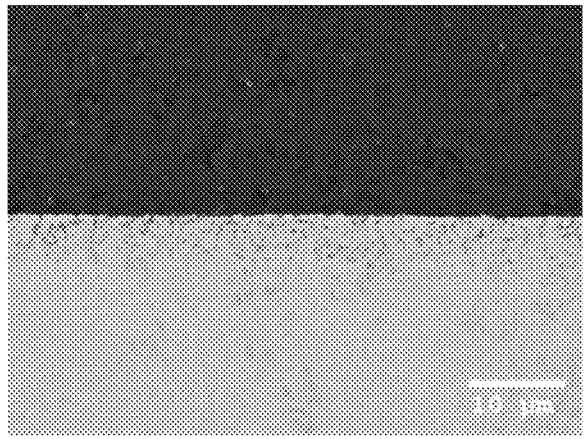
FIG. 3A shows a scanning electron microscopy micrograph of
Example 4 with a relative density of 50%.
Figure 3B:
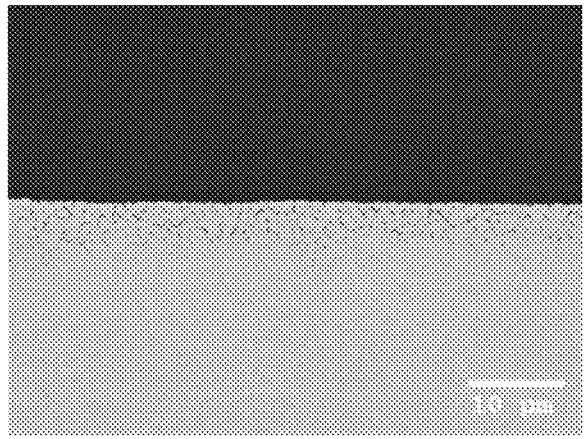
FIG. 3B shows a scanning electron microscopy micrograph of
Example 4 with a relative density of 80%.
Figure 3C:
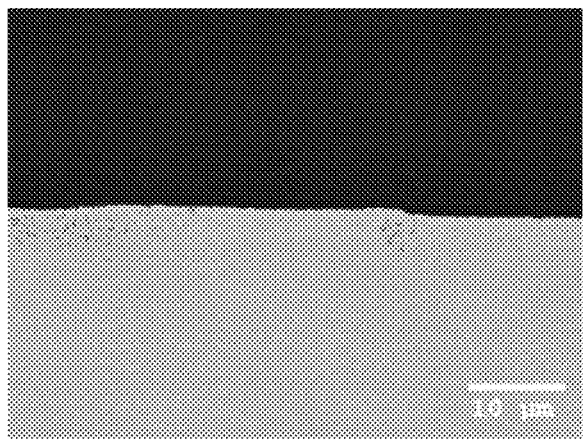
FIG. 3C shows a scanning electron microscopy micrograph of
Example 4 with a relative density of 95%.
Figure 3D:
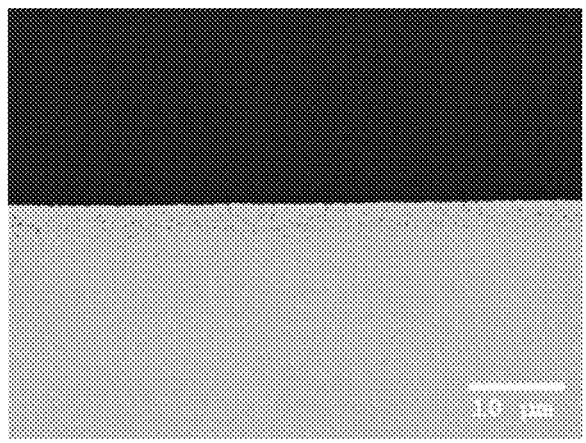
FIG. 3D shows a scanning electron microscopy micrograph of
Example 4 with a relative density of 99%.

After the sintering, the glazed small $ZrO_2$ plates were embedded in a two-component resin (EpoKwick Epoxy Resin/EpoKwick Epoxy Hardener 10:2, Buehler), polished at the boundary surface to optical quality (Apex Diamond Grinding Discs, Buehler, grain size to 0.5 μm) and subsequently examined by means of scanning electron microscopy (SEM, backscattered electrons). The results are shown in FIG. 2C. These results show that the commercial glazing material has infiltrated into the substrate material to a considerable extent.

Example 4

Influence of the Relative Density on the Infiltration Depth

Small plates (19 mm×15.4 mm×1.5 mm) were cut from commercially available blanks made of presintered $ZrO_2$ (IPS e.max ZirCAD MO 0, Ivoclar Vivadent AG) and these were presintered by thermal treatment to a relative density of 50%, 85%, 90% and 99.7%, respectively, in each case based on the true density of the substrate material. By means of an airbrushing method using a spray gun (VITA SPRAY-ON, Vita Zahnfabrik) at a working pressure of about 1 bar and from a distance of about 10 cm, an aqueous suspension of the glazing material A prepared in Example 1A was sprayed onto these small plates and, after drying in air for 30 min in a furnace (Sintramat S1 1600, Ivoclar Vivadent AG, program P7), densely sintered within 70 min and simultaneously glazed.

After the sintering, the glazed small $ZrO_2$ plates were embedded in a two-component resin (EpoKwick Epoxy Resin/EpoKwick Epoxy Hardener 10:2, Buehler), polished at the boundary surface to optical quality (Apex Diamond Grinding Discs, Buehler, grain size to 0.5 μm) and subsequently examined by means of scanning electron microscopy (SEM, backscattered electrons) and energy dispersive x-ray spectroscopy (EDX). The results are shown in FIGS. 3A-D. From these it can be seen that the infiltration depth of the glazing material according to the invention is largely independent of the relative density and thus of the residual porosity of the substrate material.

The invention claimed is:

1. Process for producing a glazed ceramic body, comprising
   (a) a glazing material is applied to a non-densely sintered substrate material having a relative density in the range of from 30 to 90%, based on the true density of the substrate material, and
   (b) the substrate material and the glazing material are subjected to a heat treatment in a temperature range which extends from a first temperature $T_1$ to a second temperature $T_2$, which is higher than the first temperature, in order to obtain the glazed body,
   wherein, at the temperature $T_1$, the glazing material has a viscosity of more than $10^{2.5}$ Pa·s, and, at the temperature $T_2$, the glazing material has a viscosity of less than $10^9$ Pa·s and the substrate material has a relative density of at least 97%, based on the true density of the substrate material.

2. Process according to claim 1, in which, at the temperature $T_1$, the glazing material has a viscosity of more than $10^{5.6}$ Pa·s, and, at the temperature $T_2$, a viscosity of less than $10^{5.6}$ Pa·s.

3. Process according to claim 1, in which the non-densely sintered substrate material is a presintered substrate material.

4. Process according to claim 1, in which the non-densely sintered substrate material has a relative density in the range of from 40 to 80, based on the true density of the substrate material.

5. Process according to claim 1, in which the substrate material begins to sinter at the temperature $T_1$.

6. Process according to claim 1, in which the substrate material is kept at the temperature $T_2$ for a period of 5 to 120 minutes.

7. Process according to claim 1, in which, at the temperature $T_2$, the substrate material has a relative density of at least 98%, based on the true density of the substrate material.

8. Process according to claim 1, in which, at a temperature $T_x$, at which the substrate material has a relative density of 95%, based on the true density of the substrate material, the glazing material has a viscosity of more than $10^{2.5}$ Pa·s.

9. Process according to claim 1, in which the glazing material has, at the temperature $T_1$, a viscosity of more than $10^{5.6}$ Pa·s, at the temperature $T_x$, at which the substrate material has a relative density of 95%, based on the true density of the substrate material, a viscosity of more than $10^{2.5}$ Pa·s and, at the temperature $T_2$, a viscosity of less than $10^9$ Pa·s.

10. Process according to claim 1, in which the substrate material is an oxide ceramic or an inorganic-inorganic composite material.

11. Process according to claim 1, in which the substrate material comprises at least two layers, which differ in their colour.

12. Process according to claim 1, in which, at a temperature of 950° C., the glazing material has a viscosity of more than $10^{2.5}$ Pa·s, at a temperature of 1300° C., a viscosity of more than $10^{2.5}$ Pa·s and, at a temperature of 1450° C., a viscosity of less than $10^9$ Pa·s.

13. Process according to claim 1, in which, at a temperature of 700° C., the glazing material has a viscosity of more than $10^{2.5}$ Pa·s, at a temperature of 900° C., a viscosity of more than $10^{2.5}$ Pa·s and, at a temperature of 1100° C., a viscosity of less than $10^9$ Pa·s.

14. Process according to claim 1, in which the glazing material comprises a frit, which comprises $SiO_2$, $Al_2O_3$ and $K_2O$ and/or $Na_2O$, and contains at least one or all of the following components in the given amounts:

| Component | wt.-% |
|---|---|
| $SiO_2$ | 50.0 to 80.0 |
| $Al_2O_3$ | 10.0 to 30.0 |
| $K_2O$ | 0 to 20.0 |
| $Na_2O$ | 0 to 10.0 |
| CaO | 0 to 10.0 |
| BaO | 0 to 10.0. |

15. Process according to claim 1, in which the glazing material is applied to the substrate material in the form of a powder, a slip, a spray or a lacquer, or by an airbrushing method or incorporated into a film or an adhesive strip.

16. Process according to claim 1, in which the glazing material is used in the form of a composition which further comprises at least one carrier, solvent, inorganic filler and/or organic filler.

17. Process according to claim 1, in which the glazing material does not substantially penetrate into the substrate material.

18. Process according to claim 1, in which the glazed ceramic body is a glazed dental body, a glazed dental restoration, a bridge, an inlay, an onlay, a crown, a veneer, a facet or an abutment.

19. Process of using a glazing material for glazing a non-densely sintered substrate material,
wherein the glazing material is applied to the non-densely sintered substrate material having a relative density in the range of from 30 to 90%, based on the true density of the substrate material, and the substrate material and the glazing material are subjected to a heat treatment in a temperature range which extends from a first temperature $T_1$ to a second temperature $T_2$, which is higher than the first temperature, wherein, at the temperature $T_1$, the glazing material has a viscosity of more than $10^{2.5}$ Pa·s and, at the temperature $T_2$, a viscosity of less than $10^9$ Pa·s and the substrate material has a relative density of at least 97%, based on the true density of the substrate material.

* * * * *